United States Patent [19]
Shaniuk et al.

[11] Patent Number: 6,107,354
[45] Date of Patent: *Aug. 22, 2000

[54] COMPOSITE MATERIAL, PREPARATION AND USE THEREOF

[75] Inventors: Thomas J. Shaniuk, Strongsville, Ohio; Robert V. Russo, Brooklyn, N.Y.

[73] Assignee: Engelhard Corporation, Iselin, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/021,642

[22] Filed: Feb. 10, 1998

Related U.S. Application Data

[63] Continuation-in-part of application No. 08/803,211, Feb. 21, 1997, abandoned.

[51] Int. Cl.[7] .................................. C02F 1/62; C02F 1/28; C02F 1/42; B01J 39/08
[52] U.S. Cl. ............................. 521/28; 210/679; 210/688; 210/912
[58] Field of Search ............................... 521/28; 210/688, 210/679, 912

[56] References Cited

U.S. PATENT DOCUMENTS

| | | | |
|---|---|---|---|
| 4,994,191 | 2/1991 | Kuznicki et al. | |
| 5,053,139 | 10/1991 | Dodwell | 210/688 |
| 5,064,534 | 11/1991 | Busch | 210/266 |
| 5,071,587 | 12/1991 | Perman | 252/181 |
| 5,082,568 | 1/1992 | Holler | 210/679 |
| 5,106,501 | 4/1992 | Yang | 210/266 |
| 5,110,479 | 5/1992 | Frommer | 210/662 |
| 5,277,931 | 1/1994 | Maglio | 427/212 |
| 5,320,773 | 6/1994 | Perman et al. | |
| 5,389,325 | 2/1995 | Bookbinder | 264/177.12 |
| 5,488,021 | 1/1996 | DeLiso | 502/63 |
| 5,561,167 | 10/1996 | Matsumoto | 521/31 |
| 5,653,878 | 8/1997 | Reid | 210/266 |
| 5,674,391 | 10/1997 | Nohren, Jr. | 210/266 |

FOREIGN PATENT DOCUMENTS

| | | |
|---|---|---|
| 0 684 210 | 11/1995 | European Pat. Off. . |
| 40 15 555 | 11/1991 | Germany . |
| 299 622 | 4/1992 | Germany . |

*Primary Examiner*—Fred Zitomer

[57] ABSTRACT

Disclosed are formed composite material compositions suitable for use in the removal of heavy metals from aqueous systems, a process for preparing said composite materials and a process for the removal of heavy metals using said composite materials. Formed particulate composite material compositions are comprised of (A) at least one ion exchange material; (B) at least one activated carbon; and, optionally, (C) at least one binder material. The method for preparing said composite material compositions comprises first mixing components (A), (B) and, optionally, (C), then forming particles from said mixture. The method for removing heavy metals from aqueous systems containing one or more heavy metals comprises contacting said aqueous system with one or more of the composite materials until the heavy metals are substantially removed from the aqueous system.

21 Claims, No Drawings

COMPOSITE MATERIAL, PREPARATION AND USE THEREOF

This application is a continuation-in-part of application Ser. No. 08/803,211, Feb. 21, 1997, now abandoned.

BACKGROUND OF THE INVENTION

1. Field of the Invention

This invention relates to novel ion exchange/carbon composite materials, methods for their preparation and processes for the removal of heavy metals and other contaminants such as volatile organic compounds (VOC's), chlorine, etc. from aqueous systems utilizing said composite materials.

2. Description of Related Art

Low levels of heavy metals (e.g., lead, cadmium, mercury, etc.) in drinking water are considered detrimental to a person's health and in the case of infants are believed to impede intellectual development. Recognizing these hazards, the Environmental Protection Agency (EPA) has established limits on the presence of heavy metals in drinking water. For example, no more than 15 parts per billion (15 ppb) of lead may be present in public water systems. In addition, industrial water streams must contain less than 0.5 ppm of heavy metals before the water can be discharged. In addition to reducing the heavy metals to acceptable EPA levels, it is desirable to improve the taste, odor and smell of drinking water by removing chlorine, ionic metals, organic molecules and colloidal particles. Ion exchangers, both organic and inorganic, including crystalline molecular sieve zeolites, are known to remove certain metals from aqueous systems such as drinking water. Activated carbon is also used in water purification or remediation processes. Activated carbon improves taste, odor and smell by adsorbing ionic metals, organic molecules and colloidal particles and also removes chlorine.

The purification of drinking water is commonly accomplished at its point of use, e.g., under-the-counter, on-the-counter, whole house systems, under-the-tap, or free standing gravity flow carafe type device. For industrial/commercial applications, packed bed systems are typically used.

There is an ongoing effort to develop improved products which meet or exceed EPA requirements for heavy metals removal as well as improved taste, color and odor, chlorine removal, and have flow rates which are commercially acceptable. Flow rates vary depending the system. For example, flow rates typically vary from 0.05 gallons per minute (gpm) for gravity-flow pour-through carafes to 1.0 gpm or more, e.g., 3.0 gpm-8.0 gpm for devices connected directly to household pressurized water lines.

It is, therefore, the purpose of this invention to provide compositions which provide such improved properties.

SUMMARY OF THE INVENTION

This invention relates to composite material compositions suitable for use in the removal of heavy metals from aqueous systems, a process for preparing said composite materials and a process for the removal of heavy metals using said composite materials.

In one embodiment, this invention relates to formed particulate composite materials comprised of (A) at least one ion exchange material; (B) at least one activated carbon; and, optionally, (C) at least one binder material.

In another embodiment, this invention relates to a method for preparing said composite material compositions which comprises first mixing components (A), (B) and, optionally, (C), then forming particles from said mixture.

In still another embodiment, this invention relates to a method for removing heavy metals from aqueous systems containing one or more heavy metals which comprises contacting said aqueous system with one or more of said composite materials until said heavy metals are substantially removed from said aqueous system.

DESCRIPTION OF THE PREFERRED EMBODIMENT

As previously stated, this invention relates to composite material compositions suitable for use in the removal of heavy metals such as lead, cadmium, zinc, copper, chromium, arsenic and mercury from aqueous systems containing one or more of said metals. The aqueous systems to which the method of the instant invention is typically applied are industrial, municipal or residential water streams. A preferred use for this method is in the treatment of drinking water.

Heavy metal removal from aqueous streams can be complicated by the presence of other contaminants, i.e., competing ions. Such competing ions include alkaline earth metals, particularly calcium or magnesium sulfates, phosphates and halide ions such as chlorides or fluorides. Commonly, the presence of these competing ions in amounts of from about 10 ppm up to about 800 ppm, commonly from about 50 ppm up to about 800 ppm, in many cases from about 200 up to about 300 ppm and more typically from about 50 up to about 200 ppm. The presence of these competing ions can make heavy metal removal from aqueous systems much more difficult. Primarily, the other ions present will compete for available adsorption sites on the adsorbent materials and lower the heavy metal removal efficiency. In drinking water treatment, the most common competing cations are calcium, magnesium, iron from rusty pipes and copper from plumbing as well as anions such as sulphate, phosphate, chloride and fluoride ions.

The ion exchange materials useful for the purposes of this invention may be amorphous or crystalline. Preferred ion exchange materials are the amorphous hydrated metal oxide and silicate gels, and the crystalline zeolite materials.

The preferred hydrated metal oxide and silicate gels are those described in U.S. Pat. Nos. 5,277,931 and 5,053,139, which are hereby incorporated herein by reference for the teachings regarding of such materials and methods for their preparation.

The zeolite materials useful in making the composite material compositions of this invention are those in powdered form and zeolites present in such materials may be natural or synthetic zeolites, or combinations thereof. Crystalline zeolites are characterized by an aluminosilicate tetrahedral framework and have ion exchangeable large cations and loosely held water molecules permitting reversible dehydration. The general formula for a zeolite is as follows: $MO.Al_2O_3.nSiO_2.xH_2O$, where M is Na, K, Ca, Sr or Ba and n and x are integers. The natural zeolites include Analcime, Chabazite, Erionite, Mordenite, Phillipsite, Clinoptilolite, and Faujasite.

Synthetic zeolites are particularly useful for the purposes of this invention and are illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-23 (U.S. Pat. No. 4,075,842), zeolite ZSM-35 (U.S. Pat. No. 4,016,245), and zeolite ZSM-38 (U.S. Pat. No. 4,046,859). The foregoing patents are hereby incorporated herein by reference with regard to their teaching of zeolite materials and processes for their preparation. Natural and synthetic zeolite materials useful for the purposes of this invention may be found in *Industrial Minerals and Rocks*, Vol. 2, 5th Edition, Stanley K. LaFonde, Editor, and *Zeolite Molecular Sieves*, T. W. Breck (1974), which are hereby incorporated herein by reference for their teaching of zeolite materials and processes for their preparation.

Particularly preferred for the purposes of this invention are zeolite materials wherein the zeolite in said material has a silica/alumina ratio of less than 20/1, preferably from about 1/1 up to about 5/1, and more preferably of about 1/1. Synthetic zeolite materials are preferred.

The zeolite materials useful for the purposes of this invention may be 100% zeolite, but typically contain other components such as kaolin microspheres. The zeolite materials usually contain at least about 25% by weight zeolite and, preferably from 50 up to about 95% by weight zeolite.

The ion exchange materials useful for the purposes of this invention are in powdered form. Typically, the average particle size of suitable ion exchange materials is less than 200 microns, although usually less than 100 microns; preferably less than 30 microns; and more preferably less than 25 microns. It may be necessary to reduce the size of the particles of the ion exchange material by grinding or otherwise into the powdered form. The BET (nitrogen method) surface area of zeolites useful for the purposes of this invention is typically from about 400 up to about 600 $M^2/g$, preferably from about 450 up to about 550 $M^2/g$.

Activated carbon suitable for the purposes of this invention include those based on coal, wood, coconut shell and peat. A variety of different particle sizes of carbon are suitable for use in this invention. In a preferred embodiment, carbon within 80×325 mesh particle size results in a substantially clear filtered water.

The composite materials of this invention will typically contain a minor amount of at least one binder material, preferably a water dispersible binder. As used herein, a "water dispersible binder" shall mean that under typical process conditions, the binder is soluble in water or other liquid medium or is sufficiently dispersed or suspended therein. Binders suitable for use within the context of the present invention include materials such as alginates, dextrin, glucose, gums, starch, waxes, glues; polymer compounds such as polyvinyl acetate, polyolefins such as polyethylene and polyprophylene, and polyvinyl alcohol; mineral acids such as sulfuric acid and phosphoric acid; phosphates such as ammonium phosphate; silica compounds such as alkaline silicates and silica hydrosol; and colloidal clays. These binder materials are typically present in an amount up to about 10% by weight of the composite materials on a moisture-free basis, preferably 1% to about 5% by weight. Typically, the polymer compound, if present as the only binder, is present in an amount up to about 20%, preferably 15% by weight of said composite material on a moisture-free basis; the silica compound, if present as the only binder, is present in an amount up to about 3% by weight of said composite material on a moisture-free basis; and the colloidal clay, if present as the only binder, is present in an amount up to about 5% by weight of said microsphere on a moisture-free basis. Amounts in excess of that necessary to achieve the desired particle strength may be present as fillers.

The term "colloidal clay" as used herein refers to metalloaluminum silicate which disperses in water into particles having an average particle size less than one-half micron, as determined by centrifugal sedimentation. The range of possible binders can be extended beyond those mentioned above by those skilled in the art. The listing above in not meant to limit the invention, but is merely intended to be exemplary. Colloidal clays typically suitable for use in the instant invention are colloidal attapulgite, colloidal sodium bentonite, colloidal montmorillonite and mixtures thereof.

The compositions of the instant invention are preferably spherical granules having particles sizes within the range of about 12×60 mesh (U.S. Standard), preferably about 16×40 mesh.

The composite material useful for the purposes of this invention is comprised of at least 5% by weight on a moisture-free basis of ion exchange material, typically from about 5 up to about 25%, at least about 25% by weight on a moisture-free basis of activated carbon, typically from about 25 up to about 75%, and, when present, at least 3% by weight on a moisture free basis of binder material, typically from about 3 up to about 15%. Preferably, said composite material comprises from about 10 up to about 15% by weight on a moisture-free basis of ion exchange material, from about 50 up to about 60% by weight on a moisture-free basis of activated carbon and from about 3 up to about 10% by weight on a moisture free basis of binder material. Additional binder material, preferably clays, may be present in said composites as filler. As used herein, a moisture-free basis shall be determined by heating at 500° C. to a constant weight.

The compositions of the instant invention are prepared by a process which comprises first mixing components (A), (B) and, optionally, (C), then forming particles from said mixture. The process preferably involves intimately mixing the components to insure uniform distribution of the components in the formed composite when combined into a granule.

The ion exchange material, activated carbon and binder are the same as, and used in the same amounts, as described above. The mixture may be prepared by combining the components in any order.

The composite materials are preferably prepared by mixing powders of the ion exchange material, activated carbon and binder in the presence of water so as to form granules. The powders can also be formed into $\frac{1}{32}$" to $\frac{1}{8}$" diameter extrudates or pressed into tablets. The formed composite materials are dried. The drying step is typically conducted at 100° C. to 120° C. in order to impart sufficient "green strength" so that the formed particles can be handled and transported. The dried particles may be screened to a desired mesh size.

It is an important feature that the formed particulate composite material maintain its integrity when treating water for the removal of heavy metals and other contaminants such that particles do not contaminate the treated water. Therefore, thermally fixing or setting the binder is preferred so that the formed particles maintain their integrity when in contact with water. The formed particles are either dried again at 130–190° C., preferably 130–150° C., or calcined in an inert atmosphere, e.g., nitrogen, at 350–700° C., preferably 400–500° C. The specific temperature needed to fix the binder depends upon the specific binder being used. For example polymer compounds are set at 140° C., whereas ceramic binders such as colloidal clays or silica compounds are set at 500° C. Another benefit of thermal fixation (e.g. calcination) is the development of a high degree of particle integrity to ensure handling without attrition in the dry state.

The mixture may be shaped into particles by methods well known in the art. Such methods include extrusion compounding, prilling, tableting and spray drying. Preferably, the particles of this invention are formed spheres prepared by spheridization on a rotating inclined plate. The shaping of components (A), (B) and, preferably, with optional component (C) into spheres in the presence of a liquid medium such as water can be carried out by spray drying, flash drying, or other conglomeration techniques such as the use of a high-shear mixer. Agglomeration in a mechanical mixer followed by drum or dish granulators is a preferred method.

Spray drying techniques are well-known. As a reference, consult, e.g., Atomization and Spray Drying, by W. R. Marshall (Chemical Engineering Monograph Series, No. 2, Vol. 50 (1954)), which is hereby incorporated by reference for its teachings in this regard.

A minor amount of a dispersing agent or a flocculating agent may also be incorporated into the mixture to facilitate dispersion/suspension of the particles in the liquid medium. In addition, materials, for example, aluminas and silicas, other than (A), (B) and (C) may be incorporated into the mixture.

In another embodiment, the mixture of ion exchange material, activated carbon, liquid (preferably water), optional binder and other optional ingredients can be agglomerated in a mechanical mixer. A preferred type of mixer employs pins or blades mounted radially on a rotating shaft, so that the tip of the pin or blade, traveling at high speed, causes solid particles, binder and water to impinge upon or contact each other in such a way as to form an agglomerate. In time, nominally spherical particles tend to grow larger and larger. This phenomenon is enhanced by the tips of the blades or pins coming very close to a stationary wall or to a solid object (e.g., another blade or pin) moving at a different relative rate. The vortexes set up by this shearing motion tend to enhance the sphericity of the growing particles.

Other less energy-intensive mechanical contacting processes are known to those skilled in the art, including the use of drum or dish granulators, fluidized or spouted bed granulators, or tumbling, rotary, vibratory or gyratory granulators. For descriptions of these processes, see, for example, Sherrington, P. J., *Granulation*, Heyden & Son, Ltd., (1981), which is incorporated herein by reference for its teaching in this regard. These and similar devices can be used to produce granules, although not all are optimum for making the instant invention.

This invention provides improved products which meet or exceed EPA drinking water requirements for the removal heavy metals as well as providing improved taste, color and odor, chlorine removal, and have flow rates which are commercially acceptable.

The formed composite materials are typically packed into a fixed-bed column or container. The heavy metal containing aqueous stream moves through the adsorbent bed system. Treated water with significantly reduced levels of heavy metals will flow out of the system. Empty bed contact times need to be from one to about 50 seconds. Preferably, the contact time should be five minutes or greater for best results. Lead concentrations in the effluent needs to be less than 15 ppb (micrograms/liter) to be considered substantially removed, however, the effluent concentrations can be as low as 2 ppb. The capacity of the composite material will be higher with higher levels of lead permitted in the effluent stream. Typically, the composite material is used as a free-flowing granular media, filled into a cartridge with holes on the top to permit entry of the contaminant solution, which is allowed to trickle through the bed of the composite material and then exit through holes on the bottom of the cartridge, possibly into a reservoir to hold the treated water.

Examples of this invention are included hereinbelow. Of course, these examples are not intended as limiting this invention as modification of the examples by ordinary expedient will be readily apparent to those of ordinary skill in the art.

Unless otherwise indicated in the following examples and elsewhere in the specification and claims, all parts and percentages are by weight on a moisture-free basis, temperatures are in degrees Celsius, pressures are at or near atmospheric.

EXAMPLE 1

A composite material having the formulation: 55% activated carbon, 12% zeolite, 25.5% attapulgite clay, and 7.5% $SiO_2$ coming from Nalco 1140 colloidal silica is prepared by mixing 611 parts of Barnebey & Sutcliffe activated carbon #B&S 3025 (80×325 mesh), 156 parts of a Na alumino-silicate zeolite having a Si/Al ratio of 1/1 and 301 parts of Attagel® 30 attapulgite clay for ten minutes in a bench-scale Eirich mixer. Then, a mixture of 185 parts of Nalco 1140 colloidal silica and 800 parts of deionized water is sprayed onto the dry powders while mixing in the Eirich mixer over a 15 minute period. The mixer is operated in a manner to produce 18×40 mesh granules. The wet granules are dried at 110° C. for 16 hours and then sieved to 18×40 mesh size. The resultant granules are calcined at 500° C. for one hour with a nitrogen gas purge.

EXAMPLE 2

A composite material having the formulation: 55% activated carbon, 12% zeolite, 23% attapulgite clay, and 10% polyolefin powder is prepared by mixing 611 parts of Barnebey & Sutcliffe activated carbon # B&S 3025 (80×325 mesh), 156 parts of a Na alumino-silicate zeolite having a Si/Al ratio of 1/1, 270 parts of Attagel 30 attapulgite clay, and 100 parts of Microthene FN510-00 for ten minutes in a bench-scale Eirich mixer. Then 800 parts of deionized water is sprayed onto the dry powders while mixing in the Eirich mixer over a 15 minute period. The mixer is operated in a manner to produce 18×40 mesh granules. The wet granules are dried at 110° C. for 16 hours and then sieved to 18×40 mesh size. The resultant granules are then placed into an oven at 140° C. for 1–2 hours.

EXAMPLE 3

A composite material having the formulation: 55% activated carbon, 12% zeolite material, 13% attapulgite clay, and 20% calcium silicate is prepared by mixing 611 parts of Barnebey & Sutcliffe activated carbon #B&S 3025 (80×325 mesh), 156 parts of a Na alumino-silicate zeolite having a Si/Al ratio of 1/1, 153 parts of Attagel® 30 attapulgite clay, and 184.5 parts of calcium hydroxide for ten minutes in a bench-scale Eirich mixer. Then, a mixture of 314 parts of Nalco 1034A colloidal silica and 950 parts of deionized water is sprayed onto the dry powders while mixing in the Eirich mixer over 15 minute period. The mixer is operated in a manner to produce 18×40 mesh granules. The wet granules are dried at 110° C. for 16 hours and then sieved to 18×40 mesh size. The resultant granules are calcined at 500° C. for one hour with a nitrogen gas purge.

What is claimed is:

1. A formed particulate composite composition suitable for use as a fixed-bed medium for the removal of heavy metals from aqueous systems comprised of (A) from about 5% to about 25% by weight of at least one ion exchange material, wherein the ion exchange material comprises at least one of a zeolite material and an amorphous hydrated metal oxide or silicate gel, (B) from about 25% to about 75% by weight of at least one activated carbon and (C) from about 3% to about 15% of at least one binder material.

2. A composition according to claim 1 wherein (A) is a zeolite.

3. A composition according to claim 2 wherein the average particle size of said zeolite material is less than 200 microns.

4. A composition according to claim 2 wherein the zeolite contained in said zeolite material has a silica/alumina ratio of less than 20/1.

5. A composition according to claim 2 wherein the zeolite component of said zeolite material has a silica/alumina ratio of from about 1/1 up to about 1/5.

6. A composition according to claim 2 wherein the average particle size of said zeolite material is less than 100 microns.

7. A composition according to claim 2 having an average particle size in the range of about 12×60 mesh.

8. A composition according to claim 2 wherein the zeolite in said zeolite material is a synthetic zeolite having a silica/alumina ratio of about 1:1.

9. A composition according to claim 2 wherein said at least one binder material is selected from the group consisting of polymer compounds, silica compounds and colloidal clays.

10. A composition according to claim 2 wherein the amount of said at least one binder is from about 3 up to about 15% by weight of the composite composition.

11. A composition according to claim 9 wherein said binder is a colloidal clay selected from the group consisting of colloidal bentonite, colloidal attapulgite and mixtures thereof.

12. A composition according to claim 9 wherein said binder is a polymer compound selected from the group of polyvinyl alcohol, polyvinyl acetate, polyethylene, polypropylene and mixtures thereof.

13. A composition according to claim 9 wherein said binder is a silica compound selected from the group consisting of alkaline silicates, colloidal silicas and mixtures thereof.

14. A method for preparing the composition of (A) from about 5% to about 25% by weight of at least one ion exchange material, wherein the ion exchange material comprises at least one of a zeolite material and an amorphous hydrated metal oxide or silicate gel, (B) from about 25% to about 75% by weight of at least one activated carbon and (C) from about 3% to about 15% of at least one binder material which comprises first mixing components (A), (B) and (C), then forming particles from said mixture.

15. A method for removing heavy metals from aqueous systems containing one or more heavy metals which comprises contacting said aqueous system with the composition of (A) from about 5% to about 25% by weight of at least one ion exchange material, wherein the ion exchange material comprises at least one of a zeolite material and an amorphous hydrated metal oxide or silicate gel, (B) from about 25% to about 75% by weight of at least one activated carbon and (C) from about 3% to about 15% of at least one binder material until said heavy metals are substantially removed from said aqueous system.

16. A method according to claim 15 wherein said system contains chlorine.

17. A method according to claim 15 wherein said system contains one or more competing ions selected from the group consisting of calcium, magnesium, sulphate, phosphate, chloride and fluoride ions.

18. A composition according to claim 1 further comprising a filler.

19. A method according to claim 14, wherein the composition further comprises a filler.

20. A method according to claim 15, wherein the composition further comprises a filler.

21. A formed particulate composite composition suitable for use as a fixed-bed medium for the removal of heavy metals from aqueous systems comprised of (A) from about 10% to about 15% by weight of at least one ion exchange material, wherein the ion exchange material comprises at least one of a zeolite material and an amorphous hydrated metal oxide or silicate gel, (B) from about 50% to about 60% by weight of at least one activated carbon, (C) from about 3% to about 10% by weight of at least one binder material, and a filler.

* * * * *